(12) United States Patent
Diguet et al.

(10) Patent No.: US 10,794,851 B2
(45) Date of Patent: Oct. 6, 2020

(54) ELECTRODE AND METHOD FOR MAKING AN ELECTRODE

(71) Applicants: SAINT-GOBAIN PERFORMANCE PLASTICS CORPORATION, Solon, OH (US); Antoine Diguet, Paris (FR); Romain Hivet, Saint-Ouen (FR)

(72) Inventors: Antoine Diguet, Paris (FR); Romain Hivet, Saint-Ouen (FR)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 430 days.

(21) Appl. No.: 15/817,969

(22) Filed: Nov. 20, 2017

(65) Prior Publication Data

US 2018/0149610 A1 May 31, 2018

Related U.S. Application Data

(60) Provisional application No. 62/428,143, filed on Nov. 30, 2016.

(51) Int. Cl.
*G01N 27/327* (2006.01)
*G01N 27/36* (2006.01)

(52) U.S. Cl.
CPC ......... *G01N 27/3271* (2013.01); *G01N 27/36* (2013.01)

(58) Field of Classification Search
CPC .. G01N 27/30; G01N 27/327; G01N 27/3271; G01N 27/36; C25B 11/00–11/18
See application file for complete search history.

(56) References Cited

U.S. PATENT DOCUMENTS

| 4,486,272 | A | 12/1984 | Fujihira |
| 6,287,451 | B1 | 9/2001 | Winarta et al. |
| 7,276,146 | B2 | 10/2007 | Wilsey |
| 8,298,401 | B2 | 10/2012 | Wilsey |
| 8,323,467 | B2 | 12/2012 | MacFie et al. |
| 2002/0045066 | A1 | 4/2002 | Beierlein et al. |
| 2002/0058103 | A1 | 5/2002 | Gu et al. |
| 2003/0116447 | A1 | 6/2003 | Surridge et al. |

(Continued)

FOREIGN PATENT DOCUMENTS

| CN | 101726528 A | 6/2010 |
| EP | 1930471 A2 | 6/2008 |

(Continued)

OTHER PUBLICATIONS

Chelikowsky et al ("Theoretical study of the electronic, structural, and cohesive properties of ruthenium", Physical Review B, vol. 34, No. 10, 1986, pp. 6656-6661). (Year: 1986).*

(Continued)

*Primary Examiner* — Alexander W Keeling
(74) *Attorney, Agent, or Firm* — Abel Schillinger, LLP; Chi Suk Kim

(57) ABSTRACT

An electrode may include a substrate, a first layer and a second layer. The first layer may include an inorganic material. The first layer may further be disposed between the substrate and the second layer. The second layer may include ruthenium. The second layer may further have a hexagonal compact crystalline structure.

18 Claims, 3 Drawing Sheets

(56) References Cited

U.S. PATENT DOCUMENTS

| | | |
|---|---|---|
| 2003/0155237 A1 | 8/2003 | Surridge et al. |
| 2005/0098433 A1 | 5/2005 | Gundel |
| 2005/0255618 A1 | 11/2005 | Kiyomiya et al. |
| 2006/0273687 A1 | 12/2006 | Fujimoto et al. |
| 2007/0026232 A9 | 2/2007 | Sasaki et al. |
| 2007/0298975 A1 | 12/2007 | Ihama et al. |
| 2008/0138624 A1 | 6/2008 | Lewis et al. |
| 2009/0104428 A1 | 4/2009 | Chung et al. |
| 2010/0112578 A1 | 5/2010 | Iwanaga et al. |
| 2010/0175992 A1 | 7/2010 | Shah et al. |
| 2010/0243046 A1 | 9/2010 | Degroot et al. |
| 2011/0193187 A1 | 8/2011 | Nakamura et al. |
| 2011/0212336 A1 | 9/2011 | Kawamoto et al. |
| 2012/0070652 A1 | 3/2012 | Krasnov et al. |
| 2012/0161268 A1 | 6/2012 | Iwanaga et al. |
| 2012/0328859 A1 | 12/2012 | Uprety et al. |
| 2013/0005066 A1 | 1/2013 | Sun et al. |
| 2013/0040516 A1 | 2/2013 | Pruneri et al. |
| 2013/0092526 A1 | 4/2013 | Yadegar et al. |
| 2013/0093288 A1 | 4/2013 | Fox et al. |
| 2013/0240840 A1 | 9/2013 | Forrest et al. |
| 2013/0248378 A1 | 9/2013 | Kanemoto et al. |
| 2015/0168336 A1* | 6/2015 | Diguet .............. G01N 27/3272 204/192.17 |

FOREIGN PATENT DOCUMENTS

| | | |
|---|---|---|
| JP | S58-180941 A | 10/1983 |
| JP | H0943193 A | 2/1997 |
| JP | H09127039 A | 5/1997 |
| JP | 2005512027 A | 4/2005 |
| JP | 2006317263 A | 11/2006 |
| JP | 2006339941 A | 12/2006 |
| JP | 2007510901 A | 4/2007 |
| JP | 2008003061 A | 1/2008 |
| JP | 2010133933 A | 6/2010 |
| JP | 2012008065 A | 1/2012 |
| JP | 2013068624 A | 4/2013 |
| KR | 20050108317 A | 11/2005 |
| WO | 2000073785 A2 | 12/2000 |
| WO | 2009067263 A1 | 5/2009 |
| WO | 2012097081 A2 | 7/2012 |
| WO | 2013017218 A1 | 2/2013 |
| WO | 2013052092 A1 | 4/2013 |
| WO | 2013055234 A1 | 4/2013 |
| WO | 2013086007 A2 | 6/2013 |
| WO | 2015095061 A1 | 6/2015 |
| WO | 2018102175 A1 | 6/2018 |

OTHER PUBLICATIONS

Rydzek, M. et al., "Comparative study of sol-gel derived tin-doped indium- and aluminum-doped zinc-oxide coatings or electrical conducting and low-emitting surfaces," Progress in Organic Coatings, vol. 70, dated 2011, pp. 369-375.

Dimopoulos, T. et al., "Increased thermal stability of Al-doped ZnO-based transparent conducting electrodes employing ultra-thin Au and Cu layers," Thin Solid Films, vol. 520, 2012, pp. 5222-5226.

Girtan, M., "Comparison of ITO/metal/ITO and ZnO/metal/ZnO characteristics as transparent electrodes for third generation solar cells," Solar Energy Materials & Solar Cells, vol. 100, 2012, pp. 153-161.

Jeong, J. et al., "Comparison of electrical, optical, structural, and interface properties of IZO-Ag-IZO and IZO-Au-IZO multilayer electrodes for organic photovoltaics," Journal of Applied Physics, vol. 107, 2010, 9 pgs, American Institute of Physics.

Kim, D., "Low temperature deposition of transparent conducting ITO/Au/ITO films by reactive magnetron sputtering," Applied Surface Science, vol. 256, 2010, pp. 1774-1777.

Lansåker, P.C. et al., "TiO2/Au/TiO2 multilayer thin films: Novel metal-based transparent conductors for electrochromic devices," Thin Solid Films, vol. 518, 2009, pp. 1225-1229.

Lee, H.M. et al., "Annealing effect of ZnO/Au/ZnO transparent conductive films," Vacuum, vol. 86, 2012, pp. 1494-1498.

International Search Report and Written Opinion for PCT/US2014/070364 dated Apr. 8, 2015, 15 pages.

Egelhoff, Jr., W.F. et al., "Fe/Cu/Fe and Co/Cu/Cu multilayers on Cu(111): the absence of oscillatory antiferromagnetic coupling," IEEE Transactions on Magnetics, Sep. 1992, vol. 28, No. 5, pp. 2742-2744.

Dimopoulos, T. et al., "Characterization of ZnO:Al/Au/ZnO:Al Trilayers for High Performance Transparent Conducting Electrodes," Thin Solid Films, 2010, vol. 519, pp. 1470-1474.

Axelevitch, A. et al., "Investigation of Optical Transmission in Thin Metal Films," Physics Procedia, vol. 32, 2012, pp. 1-13.

Morfa, A. et al., "Transparent Metal Electrodes From Ordered Nanosphere Arrays," Journal of Applied Physics, vol. 114, 2013, pp. 054502-1 through 054502-6, American Institute of Physics.

Brewer, Scott H. et al., "Calculation of the Electronic and Optical Properties of Indium Tin Oxide by Density Functional Theory," Chemical Physics, vol. 300, dated 2004, pp. 285-293.

Extended European Search Report for EP Application No. 14872103.8, dated Jul. 12, 2017, 8 pages.

International Search Report and Written Opinion for PCT/US2017/062534, dated Feb. 12, 2018, 15 pages.

Guillén, C. et al., "ITO/metal/ITO multilayer structures based on Ag and Cu metal films for high-performance transparent electrodes," Solar Energy Materials & Solar Cells, vol. 92, 2008, pp. 938-941.

\* cited by examiner

ELECTRODE AND METHOD FOR MAKING AN ELECTRODE

CROSS-REFERENCE TO RELATED APPLICATION

This Application claims priority under 35 U.S.C. § 119(e) to U.S. Provisional Patent Application No. 62/428,143, entitled "ELECTRODE AND METHOD FOR MAKING AN ELECTRODE," by Antoine DIGUET et al., filed Nov. 30, 2016, which is assigned to the current assignee hereof and is incorporated herein by reference in its entirety.

FIELD OF THE DISCLOSURE

The present disclosure relates to an electrode, and more particularly to, a thin film electrode for biosensor applications.

RELATED ART

Electrochemical glucose biosensors generally include two electrodes with at least one of the electrodes having both a metallic layer and a non-metallic layer in direct contact with the metallic layer. The reactivity of certain noble metal electrodes that may be included in an electrochemical glucose biosensor is generally more pronounced immediately after production, but may be reduced and sometimes eliminated in significantly aged products. The non-metallic layer is generally a carbon layer that is used to create an activated electrode that, when new, mimics the characteristics of a non-activated product that has not been aged. In other words, the sensitivity of the electrode is sacrificed for a consistent reading of potential.

However, there is a continuing need for an electrode with improved performance. For example, reducing the amount of metal, particularly expensive metals such as gold, used in the electrode can reduce cost. Further, there remains a need for an electrode with a reduced amount of metal that can maintain performance.

SUMMARY

According to one aspect, an electrode may include a substrate, a first layer and a second layer. The first layer may include an inorganic material. The first layer may further be disposed between the substrate and the second layer. The second layer may include ruthenium. The second layer may further have a hexagonal compact crystalline structure.

According to yet another aspect, an electrode may include a substrate, a first layer and a second layer. The first layer may include an inorganic material. The first layer may further be disposed between the substrate and the second layer. The second layer may include ruthenium. The second layer may further have a Crystal Orientation Ratio (COR) of at least about 20.

According to still another aspect, an electrode may include a substrate, a first layer and a second layer. The first layer may include an inorganic material. The first layer may further be disposed between the substrate and the second layer. The second layer may include ruthenium. The first layer may have a shorter lattice parameter $a_1$ and the second layer may have a shorter lattice parameter $a_2$, such that $a_1$ and $a_2$ satisfy the following formula: $\frac{5}{6}*(a_1/a_2)=x$, where x represents a value of at least about 0.98 and not greater than about 1.02.

According to yet another aspect, a biosensor test strip may include an electrode system that includes an electrode. The electrode may include a substrate, a first layer and a second layer. The first layer may include an inorganic material. The first layer may further be disposed between the substrate and the second layer. The second layer may include ruthenium. The second layer may further have a hexagonal compact crystalline structure.

According to still another aspect, a method of forming an electrode may include providing a substrate, depositing a first layer on the substrate, and depositing a second layer on the first layer. The first layer may further be disposed between the substrate and the second layer. The second layer may include ruthenium. The second layer may further have a hexagonal compact crystalline structure.

BRIEF DESCRIPTION OF THE DRAWINGS

Embodiments are illustrated by way of example and are not limited by the accompanying figure.

Figure 1:
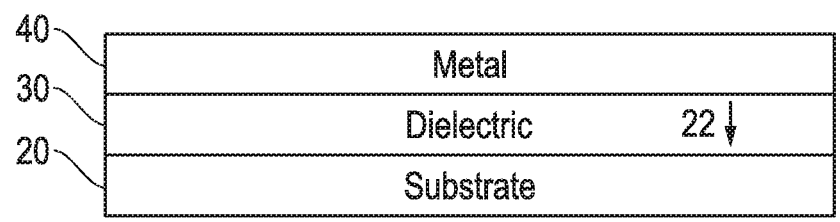
FIG. 1 includes an illustration of an electrode according to embodiments described herein.

Skilled artisans appreciate that elements in the figures are illustrated for simplicity and clarity and have not necessarily been drawn to scale. For example, the dimensions of some of the elements in the figures can be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but can include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item can be used in place of a single item. Similarly, where more than one item is described herein, a single item can be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and can be found in textbooks and other sources within the electrode and biosensor arts.

Embodiments described herein are generally directed to an electrode or a method of forming an electrode where the electrode includes a substrate, a first layer, and a second layer. The first layer may include an inorganic material and the second layer may include ruthenium. According to particular embodiments, the second layer may have a hexagonal compact crystalline structure. According to still other embodiments, the second layer may have a Crystal Orientation Ratio (COR) of at least about 20. According to yet other embodiments, the first layer may have a shorter lattice parameter $a_1$ and the second layer may have a shorter lattice parameter $a_2$, such that $a_1$ and $a_2$ satisfy the following formula: $\frac{5}{6}*(a_1/a_2)=x$, where x represents a value of at least about 0.98 and not greater than about 1.02.

In certain embodiments, an electrode formed according to embodiments described herein can be a thin film electrode. According to still other embodiment, the thin film electrode can be for us in biosensors or biosensor test strips that measure the glucose level in a sample, such as, a blood sample.

According to still other embodiments described herein, a biosensor or biosensor test strip may include an electrode formed according to embodiments described herein. For example, a biosensor or biosensor test strip may include an electrode that may include a substrate, a first layer and a second layer. The first layer may include an inorganic material and the second layer may include ruthenium. According to particular embodiments, the second layer may have a hexagonal compact crystalline structure. According to still other embodiments, the second layer may have a Crystal Orientation Ratio (COR) of at least about 20. According to yet other embodiments, the first layer may have a shorter lattice parameter $a_1$ and the second layer may have a shorter lattice parameter $a_2$, such that $a_1$ and $a_2$ satisfy the following formula: $\frac{5}{6}*(a_1/a_2)=x$, where x represents a value of at least about 0.98 and not greater than about 1.02.

FIG. 1 includes an illustration showing the configuration of an electrode 10 formed according to embodiments described herein. As shown in FIG. 1, electrode 10 may include a substrate 20, a first layer 30 and a second layer 40. As illustrated, the first layer 30 can be disposed adjacent to the substrate 20 and the second layer 40 can be disposed adjacent to the first layer 30 such that the first layer 30 is located between the substrate 20 and the second layer 40.

According to certain embodiments, the first layer 30 can directly contact the substrate 20, the second layer 40, or both. For example, the first layer 30 can be disposed directly adjacent the substrate 20 such that the first layer 30 is directly contacting the substrate 20. Additionally, the second layer 40 can be disposed directly adjacent the first layer 30 such that the second layer 40 is directly contacting the first layer 30.

According to still other embodiments, the electrode 10 can include additional layers. For example, the electrode 10 can include an intermediate layer or intermediate layers (not show in FIG. 1) disposed between one or more of the substrate 20, the first layer 30, and the second layer 40.

According to yet other embodiments, the electrode 10 formed as described herein may be an inert electrode, such as, an inert thin film electrode.

In certain embodiments, the electrode 10 can be a biosensor electrode, such as, for example, a biosensor electrode that can measure the glucose level of a sample, such as, a blood sample. In particular embodiments, the electrode 10 can contain a layer comprising a chemical solution (not shown in FIG. 1), such as a solution containing an enzyme, a mediator, an indicator, or any combination thereof. In particular embodiments, the electrode 10 can be reactive to glucose. For example, glucose can be indirectly degraded by the electrode 10 by first reacting with an enzyme to form a subproduct and the electrode 10 is reactive with the subproduct.

According to still other embodiments, the electrode 10 can be part of a biosensor, such as, a biosensor test strip adapted to measure the level of glucose in a sample, such as, a blood sample. In certain embodiments, the test strip can include a working electrode and a counter electrode and the electrode 10 described herein can be present as the working electrode, the counter electrode, or both.

According to yet other embodiments, the first layer 30 and the second layer 40 can be epitaxial layers and, particularly, heteroepitaxial layers. In more particular embodiments, the first layer 30 can be a growth underlayer and the second layer 40 can be an epitaxial overlayer. Epitaxy may refer to the deposition of a crystalline overlayer over a crystalline underlayer. Homoepitaxy may refer to the overlayer and the underlayer being formed of the same material. Heteroepitaxy may refer to the epitaxial overlayer being formed on a growth underlayer of a different material. In epitaxial growth, the underlayer can act as a seed crystal locking the overlayer into one or more ordered crystallographic orientations with respect to the underlayer. Growth can be nonepitaxial if the overlayer does not form an ordered layer with respect to the underlayer.

In certain embodiments, the introduction of a growth underlayer can improve the quality of the electrode, such as to improve its sheet resistance. In other words, as compared to an electrode without the growth underlayer, it has been surprisingly discovered that in certain embodiments, it is possible to decrease the amount of metal in the epitaxial overlayer by about 10% while maintaining the same sheet resistance of the electrode.

Sheet resistance measures the electrical resistance of thin films that are nominally uniform in thickness. Commonly, electrical resistivity is presented in units such as Ω·cm. To obtain a sheet resistance value, electrical resistivity is divided by the sheet thickness, and the unit can be represented as Ω. To avoid being misinterpreted as bulk resistance of 1 ohm, an alternate common unit for sheet resistance is "ohms per square" (denoted "Ω/sq" or "Ω/□"), which is dimensionally equal to an ohm, but is exclusively used for sheet resistance.

While the sheet resistance is a measure of the whole electrode, the contribution of the substrate and the first layer are negligible. For example, in one embodiment, the substrate can provide no contribution to the sheet resistance of the electrode. In further embodiments, the contribution of a 5 nm AZO underlayer to the total measured sheet resistance of the electrode is negligible, such as about 0.0005 Ohm/sq.

According to particular embodiments, the electrode 10 can have a particular sheet resistance. For example, the electrode 10 may have a sheet resistance of at least about 2.0

Ohms/sq, such as, at least about 2.25 Ohms/sq, at least about 2.5 Ohms/sq, at least about 2.75 Ohms/sq, at least about 3.0 Ohms/sq, at least about 4.0 Ohms/sq, at least about 5.0 Ohms/sq or even at least about 10 Ohms/sq.

According to certain embodiments, the substrate 20 may be constructed out of any material suitable for the substrate of an electrode. According to certain embodiments, the material forming the substrate can contain a polymer, a flexible polymer, or a transparent polymer. Suitable polymers can include, for example, polycarbonate, polyacrylate, polyester, polyethylene terephthalate (PET), polyethylene naphthalate (PEN), cellulose triacetated (TCA or TAC), polyurethane, or any combination thereof. In particular embodiments, the substrate can be a glass substrate, such as a transparent glass substrate.

According to yet other embodiments, the substrate 20 may have a particular thickness suitable for an electrode. For example, the substrate 20 may have a thickness of at least about 1 micron, such as, at least about 5 microns, at least about 10 microns, at least about 15 microns, at least about 20 microns, at least about 25 microns, at least about 30 microns, at least about 35 microns, at least about 40 microns, at least about 45 microns or even at least about 50 microns. According to still other embodiments, the substrate 20 may have a thickness of not greater than about 1,000 microns, such as, not greater than about 750 microns, not greater than about 500 microns, not greater than about 400 microns or even not greater than about 300 microns. It will be appreciated that the substrate 20 may have a thickness within a range between any of the minimum and maximum values noted above. It will be further appreciated that the substrate 20 may have a thickness of any value between any of the minimum and maximum values noted above. For example, the substrate can have a thickness in a range of from about 20 microns to about 500 microns or from about 40 microns to about 300 microns. In very particular embodiments, the substrate can have a thickness in a range of from about 100 microns to about 300 microns.

According to still other embodiments and as shown in FIG. 1, a surface 22 of the substrate 20 that is adjacent to first layer 30 can be mechanically treated to improve adhesion between the substrate 20 and first layer 30. For example, mechanically treating the surface 22 of the substrate 20 can include blasting or mechanically etching the surface 22 of the substrate 20.

According to yet other embodiments, the surface 22 of the substrate 20 may have a particular surface roughness ($R_{rms}$). For example, the surface 22 may have a roughness of at least about 1 nm, such as, at least about 2 nm, at least about 3 nm, at least about 4 nm, at least about 5 nm, at least about 10 nm, at least about 50 nm or even at least about 100 nm. According to yet other embodiments, the surface 22 may have a surface roughness of not greater than about 200 nm, such as, not greater than about 180 nm, not greater than about 160 nm, not greater than about 140 nm or even not greater than about 120 nm. It will be appreciated that the surface 22 may have a surface roughness of any value within a range between any of the minimum and maximum values noted above. It will be further appreciated that the surface 22 may have a thickness of any value between any of the minimum and maximum values noted above.

Referring again to FIG. 1, first layer 30 may be disposed over substrate 20. For example, first layer 30 may be disposed between substrate 20 and second layer 40.

According to particular embodiments, the first layer 30 may contain one or more of the following materials and the one or more materials contained in the first layer can have one or more, or even all, of the following characteristics.

According to certain embodiments, the first layer 30 may include an inorganic material, such as, an oxide, a metal oxide, a transparent metal oxide, a dielectric compound or a combination thereof. According to particular embodiments, the first layer 30 may be a dielectric layer that may contain a dielectric material. According to certain embodiments, the particular dielectric materials may include a metal oxide. According to still other embodiments, the metal oxide may include zinc oxide, indium oxide, tin oxide, cadmium oxide, or any combination thereof. For example, suitable metal oxides may be aluminum zinc oxide (AZO), indium tin oxide (ITO), antimony tin oxide (ATO), fluorine tin oxide (FTO), or any combination thereof. In very particular embodiments, the first layer can contain AZO. According to still other embodiments, the first layer may be an AZO layer.

According to certain embodiments, the first layer 30 may include a crystalline material. According to still other embodiments, the first layer 30 may include a polycrystalline material.

According to yet other embodiments, the first layer 30 may contain substantially no carbon. According to yet other embodiment, the first layer 30 may contain substantially no carbon in the form of graphite.

According to still other embodiments, the first layer may include a particular content of inorganic material. For example, the first layer may include at least about 50 wt. % inorganic material for a total weight of the first layer, such as, at least about 55 wt. %, at least about 60 wt. %, at least about 65 wt. %, at least about 70 wt. %, at least about 75 wt. %, at least about 80 wt. %, at least about 85 wt. %, at least about 90 wt. %, at least about 95 wt. % inorganic material for a total weight of the first layer. According to still other embodiments, the first layer may include not greater than about 100 wt. %, such as, not greater than about 99 wt. %, not greater than about 95 wt. %, not greater than about 90 wt. %, not greater than about 85 wt. %, not greater than about 80 wt. %, not greater than about 75 wt. % inorganic material for a total weight of the first layer. It will be appreciated that the total content of inorganic material in the first layer may be any value within a range between any of the minimum and maximum values noted above. It will be further appreciated that the total content of inorganic material in the first layer may be any value between any of the minimum and maximum values noted above.

According to still other embodiments, the first layer 30 may have a particular thickness. For example, the first layer 30 may have a thickness of not greater than about 20 nm, such as, not greater than about 17 nm, not greater than about 15 nm, not greater than about 13 nm, not greater than about 10 nm, not greater than about 7 nm or even not greater than about 5 nm. According to still other embodiments, the first layer 30 may have a thickness of at least about 1 nm, such as, at least about 2 nm, at least about 3 nm, at least about 4 nm or even at least about 5 nm. It will be appreciated that the thickness of the first layer 30 may be any value within a range between any of the minimum and maximum values noted above. It will be further appreciated that the thickness of the first layer 30 may be any value between any of the minimum and maximum values noted above.

According to yet other embodiments, the first layer 30 may consist essentially of a metal oxide. As used herein, the phrase "consisting essentially of a metal oxide" refers to at least 95 atomic % of a metal oxide.

Referring again to FIG. 1, second layer 40 can contain one or more of the following materials and the one or more materials contained in the second layer can have one or more, or even all, of the following characteristics.

According to particular embodiments and as noted herein, the second layer 40 may include ruthenium. According to still other embodiments the second layer may be a ruthenium layer.

According to yet other embodiments, the second layer 40 may include a crystalline material. According to still other embodiments, the second layer 40 may include a polycrystalline material. According other embodiments the ruthenium of the second layer 40 may be a crystalline material. According to yet other embodiments, the ruthenium of the second layer 40 may be a polycrystalline material.

According to yet other embodiments, the second layer 40 may have a hexagonal compact crystalline structure. According to still other embodiments, the ruthenium material of the second layer 40 may have a hexagonal compact crystalline structure.

According to certain embodiments, the second layer 40 may be referred to as a film. According to yet other embodiment, the second layer 40 may be referred to as a thin film.

According to certain embodiments, the second layer 40 may have a particular thickness. For example, the second layer 40 may have a thickness of at least about 10 nm, such as, at least about 15 nm, at least about 20 nm, at least about 25 nm, at least about 30 nm, at least about 35 nm, at least about 40 nm, at least about 45 nm or even at least about 50 nm. According to still other embodiments, the second layer 40 may have a thickness of not greater than about 150 nm, such as, not greater than about 140 nm, not greater than about 130 nm, not greater than about 120 nm, not greater than about 110 nm or even not greater than about 100 nm. It will be appreciated that the thickness of the second layer 40 may be any value within a range between any of the minimum and maximum values noted above. It will be further appreciated that the thickness of the second layer 40 in the first layer may be any value between any of the minimum and maximum values noted above.

According to yet other embodiments, the second layer 40 may have a particular total thickness variation (TTV). For example, the second layer 40 may have TTV of not greater than about 15 nm, such as, not greater than about 10 nm, not greater than about 8 nm, not greater than about 6 nm, not greater than about 5 nm or even not greater than about 4 nm. As used herein, the TTV is the difference between maximum and minimum thickness values along a square millimeter segment spanning the length and width of the layer.

According to yet other embodiments, aspects of the electrode may be described as having a particular performance, such as, by having a particular Visible Light Transmittance (VLT). The VLT is a measure of the amount the visible spectrum (380 to 780 nanometers) that is transmitted through a composite or layer and, as described herein, is presented as a percentage. The VLT can be measured according to standard ISO 9050. Although ISO 9050 refers to glazings, the same procedure can be used with a film taped or otherwise adhered to a transparent substrate.

According to particular embodiments, the second layer 40 may have a particular VLT. For example, the second layer 40 may have a VLT of not greater than about 70%, such as, not greater than about 60%, not greater than about 50%, not greater than about 40%, not greater than about 30%, not greater than about 25%, not greater than about 20%, not greater than about 15%, not greater than about 10%, not greater than about 5%, not greater than about 4%, not greater than about 3%, not greater than about 2%, or no greater than 1%. According to yet other embodiments, the second layer 40 may have a VLT of at least about 1%, such as, at least about 2%, at least about 3%, at least about 4%, at least about 5% or even at least about 10%. It will be appreciated that the second layer 40 may have a VLT of any value within a range between any of the minimum and maximum values noted above. It will be further appreciated that the second layer 40 may have a VLT of any value between any of the minimum and maximum values noted above.

According to certain embodiments, the VLT of the second layer 40 may be related, such as inversely proportional, to the thickness of the second layer 40. In other words, in certain embodiments, the VLT of the second layer 40 may tend to decrease as the thickness of the second layer 40 increases.

According to other embodiments, the second layer 40 can contain ruthenium at a particular content. For example, the second layer 40 may contain ruthenium in an amount of at least about 50 wt. % for a total weight of the second layer 40, such as, at least about 60 wt. %, at least about 70 wt. %, at least about 80 wt. %, at least about 90 wt. %, at least about 99 wt. % for a total weight of the second layer 40. According to yet other embodiments, the second layer 40 can contain ruthenium in an amount of not greater than about 99 wt. % for a total weight of the second layer 40, such as, not greater than about 95 wt. % or even not greater than about 90 wt. % for a total weight of the second layer 40. It will be appreciated that the second layer 40 may contain ruthenium at an amount of any value within a range between any of the minimum and maximum values noted above. It will be further appreciated that the second layer 40 may contain ruthenium at an amount of any value between any of the minimum and maximum values noted above.

According to still other embodiments, the second layer 40 may contain an essentially pure metal or in other embodiments, a metal alloy. As used herein, "essentially pure metal" refers to a metal oxide having possible impurities in an amount of less than about 5 atomic %.

According to other embodiments, the second layer 40 may have a particular conductivity. For example, the second layer 40 may have a conductivity of not greater than $15 \times 10^{-6}$ Ohm·cm, such as, not greater than $13 \times 10^{-6}$ Ohm·cm, not greater than $11 \times 10^{-6}$ Ohm·cm, not greater than $10 \times 10^{-6}$ Ohm·cm, not greater than $9 \times 10^{-6}$ Ohm·cm, not greater than $8 \times 10^{-6}$ Ohm·cm, not greater than $7 \times 10^{-6}$ Ohm·cm, or even not greater than $6 \times 10^{-6}$ Ohm·cm. According to yet other embodiments, the second layer 40 may have a conductivity of at least about $1 \times 10^{-6}$ Ohm·cm, such as, at least about $2 \times 10^{-6}$ Ohm·cm, at least about $3 \times 10^{-6}$ Ohm·cm or even at least about $4 \times 10^{-6}$ Ohm·cm. It will be appreciated that the second layer 40 may have a conductivity of any value within a range between any of the minimum and maximum values noted above. It will be further appreciated that the second layer 40 may have a conductivity of any value between any of the minimum and maximum values noted above.

According to still other embodiments, the second layer 40 may have a particular Crystal Orientation Ratio (COR). For purposes of embodiments described herein, the COR of the second layer 40 may be calculated from X-ray diffraction (i.e., Bragg-Brentano geometry) plot measured from the second layer and may be equal to the ratio of the peak intensity of the plot at 42° divided by the peek intensity of the plot at 44°. For example, the second layer 40 may have a COR of not greater than about 20.

According to still other embodiments, the first layer 30 and the second layer 40 may have a particular crystalline structure mismatch. The crystal structure of a material or of a layer (i.e., the arrangement of atoms within a given type of crystal) can be described in terms of its simplest repeating unit, referred to as a unit cell, having unit-cell-edge lengths a, b, and c, referred to as lattice parameters with a being shorter lattice parameter. In this context, the crystal structure mismatch between the first layer 30 having a shorter lattice parameter ($a_1$) and the second layer 40 having a shorter lattice parameter ($a_2$) may be defined by the following formula: $5/6*(a_1/a_2)=x$, where x represents a value of at least about 0.98, such as, at least about 0.99 or even at least about 1.0. According to still other embodiments, the crystal structure mismatch between the first layer having a shorter lattice parameter ($a_1$) and the second layer having a shorter lattice parameter ($a_2$) may be defined by the following formula: $5/6*(a_1/a_2)=x$, where x represents a value of not greater than about 1.02. It will be appreciated that the x value of the formula defining crystal structure mismatch may be any value within a range between any of the minimum and maximum values noted above. It will be further appreciated that the x value of the formula defining crystal structure mismatch may be any value between any of the minimum and maximum values noted above.

For example, the crystal structure of gold is face centered cubic (fcc) and its lattice parameter a is 0.408 nm. Because the crystal structure of gold is cubic, it can have only one lattice parameter. Under ambient conditions, ZnO mainly crystallizes under wurtzite form. Lattice parameters for ZnO in wurtzite form are a=0.325 nm and c=0.520 nm. When this form is oriented in the so-called (002) orientation, the surface can have atom distances similar to that of gold when the gold crystal is oriented in the so called (111) orientation. That is, $([sqrt(2)/2] \times a_{Au}) \sim a_{ZnO}$, which corresponds to 0.29 nm-0.33 nm. The effect with AZO (=ZnO:Al) can be similar, even when Al atoms are intercalated in the network. In very particular embodiments, AZO and gold can be used as first and second layers, respectively.

On the other hand, if Au is deposited on another dielectric, such as TiOx, the heteroepitaxy effect is not effective since the mismatch between crystal structures is high. For example, when TiOx is deposited by magnetron sputtering without thermal treatment, the material can be amorphous (in this case there is no specific order) or can have a rutile crystal structure. A rutile crystal structure has a body-centered tetragonal unit cell with a=b=0.458 nm and c=0.295 nm. In certain embodiments, from this structure, TiOx does not appear to have a crystal structure that closely matches the crystal structure of an Au unit cell, regardless of orientation. In particular embodiments, the first layer can be free of tin oxide.

According to yet other embodiments, an electrode formed according to embodiments described herein may further include a third layer overlying the first and the second layer. According to certain embodiments, the third layer may include gold (Au). According to yet other embodiments, the third layer may be a gold layer. According to still other embodiments, the third layer may include palladium (Pd). According to still other embodiments, the third layer may be a palladium layer.

Also described herein are electrochemical sensors. According to particular embodiments, the electrochemical sensors may be adapted to detect the presence of, and/or measure the concentration of, an analyte by way of electrochemical oxidation and reduction reactions within the sensor. These reactions can be transduced to an electrical signal that can be correlated to an amount or concentration of the analyte. In certain embodiments, the electrochemical sensor can be a biosensor test strip.

According to still other embodiments, the test strip may include a base substrate, a spacing layer, a covering layer, or any combination thereof. The base substrate can include an electrode system and the electrode system can include a set of measuring electrodes, e.g., at least a working electrode and a counter electrode, within a sample-receiving chamber. According to particular embodiments, one or more of the electrodes in the electrode system can include an electrode as described herein.

Further, in particular embodiments, the spacing layer of the test strip can define a sample-receiving chamber extending between the base substrate and the covering layer. The sample-receiving chamber can be adapted such that a sample fluid can enter a chamber and be placed in electrolytic contact with both the working electrode and the counter electrode. Such contact can allow electrical current to flow between the measuring electrodes to affect the electrooxidation or electroreduction of the analyte. In very particular embodiments, the sample fluid can be a blood sample, such as a human blood sample, and the sensor can be adapted to measure the glucose level in such a sample.

Moreover, a suitable reagent system can overlie at least a portion of the electrodes or electrode pairs within the sample-receiving chamber. The reagent system can include additives to enhance the reagent properties or characteristics. For example, additives can include materials to facilitate the placement of the reagent composition onto the test strip and to improve its adherence to the strip, or for increasing the rate of hydration of the reagent composition by the sample fluid. Additionally, the additives can include components selected to enhance the physical properties of the resulting dried reagent layer, and the uptake of a liquid test sample for analysis. In certain embodiments, the additives can include thickeners, viscosity modulators, film formers, stabilizers, buffers, detergents, gelling agents, fillers, film openers, coloring agents, agents endowing thixotropy, or any combination thereof.

In further embodiments, the covering layer can be adapted to form a top surface of the sample-receiving chamber. Moreover, the covering layer can be adapted to provide a hydrophilic surface to aid in acquisition of the test sample. In particular embodiments, the covering layer can define a vent opening that allows air to escape from the interior of the chamber as the sample fluid enters and moves into the sample-receiving chamber.

According to certain embodiments, an electrode as described herein can be formed according to any appropriate method. In general, forming the electrode includes providing a substrate as described herein, depositing the first layer as described herein, and depositing the second layer as described herein. For example, the first layer can be deposited over the substrate and the second layer can be deposited over the first layer. In certain embodiments, the first layer can be deposited directly onto the substrate. In still other embodiments, the second layer can be deposited directly onto the first layer.

According to still other embodiments, the method may include depositing one or more of the layers by physical vapor deposition, such as sputtering or even magnetron sputtering. According to certain embodiments, the first layer 30 may be deposited with or without annealing. In certain embodiments, the first layer 30 may be deposited without annealing. The materials used for forming the first layer 30 may have a standard deposition rate.

According to yet other embodiments, the first layer 30 and the second layer 40 may be deposited by roll-to-roll processing. Roll-to-roll processing refers to a process of applying coatings starting with a roll of a flexible material and re-reeling after the process to create an output roll. In certain embodiments, the roll-to-roll process can include depositing the first and second layers using two cathodes, such as simultaneously using two cathodes.

According to still other embodiments, the second layer 40 may be deposited at a particular pressure. For examples, the second layer 40 may be deposited at a pressure of not greater than about 3 mTorr, such as, not greater than about 2.8 mTorr, not greater than about 2.5 mTorr, not greater than about 2.3 mTorr or even not greater than about 2.0 mTorr. According to particular embodiments, the second layer 40 may be deposited at any pressure between any of the values noted above.

Embodiments of the method described herein can increase the production time and improve the TTV of the coating as described herein. In certain embodiments, the method can increase production time by 10% as compared to conventional methods of forming a similar electrode without a first layer 30, particularly a dielectric layer.

The present disclosure represents a departure from the state of the art. In particular, it has heretofore been unknown how to form an electrode which can provide the performance characteristics, and particularly the combination of performance characteristics described herein. For example, the present disclosure illustrates various electrodes having a dielectric layer and a layer comprising ruthenium having a particular crystalline structure, Crystal Orientation Ratio or lattice parameter mismatch. Such constructions as described in detail herein have unexpectedly been found to exhibit significantly superior sheet resistance that were heretofore impossible to achieve relative to its thickness. The introduction of the first layer as described herein can improve the quality of the electrode. For example, it is possible to improve the sheet resistance, or decrease the amount of material used for the second layer, particularly expensive metals such as gold, and maintain the same sheet resistance, as compared to an electrode without the first layer. The concepts are better understood in view of the embodiments described below that illustrate and do not limit the scope of the present invention.

Many different aspects and embodiments are possible. Some of those aspects and embodiments are described below. After reading this specification, skilled artisans will appreciate that those aspects and embodiments are only illustrative and do not limit the scope of the present invention. Embodiments can be in accordance with any one or more of the items as listed below.

Embodiment 1

An electrode comprising: a substrate; a first layer comprising an inorganic material; and a second layer comprising ruthenium, wherein the second layer has a hexagonal compact crystalline structure, and wherein the first layer is disposed between the substrate and the second layer.

Embodiment 2

An electrode comprising: a substrate; a first layer comprising an inorganic material; and a second layer comprising ruthenium, wherein the first layer is disposed between the substrate and the second layer, and wherein the second layer has a Crystal Orientation Ratio of at least about 20.

Embodiment 3

An electrode comprising: a substrate; and a first layer comprising an inorganic material having a shorter lattice parameter $a_1$; and a second layer comprising a ruthenium having a shorter lattice parameter $a_2$, wherein $a_1$ and $a_2$ satisfy the following formula: $\frac{5}{6}*(a_1/a_2)=x$, where x represents a value of at least about 0.98 and not greater than about 1.02.

Embodiment 4

A biosensor test strip comprising: an electrode system that includes an electrode, the electrode comprising: a substrate; a first layer comprising an inorganic material; and a second layer comprising ruthenium, wherein the second layer has a hexagonal compact crystalline structure, and wherein the first layer is disposed between the substrate and the second layer.

Embodiment 5

A method of forming an electrode, the method comprising: providing a substrate; depositing a first layer on the substrate, wherein the first layer comprises an inorganic material; and depositing a second layer on the first layer, wherein the second layer comprises ruthenium, wherein the second layer has a hexagonal compact crystalline structure, and wherein the first layer is disposed between the substrate and the second layer.

Embodiment 6

The electrode, biosensor test strip, composite and method of any of embodiments 1, 2, 3, 4 and 5, wherein the second layer has a sheet resistance of at least about 2.0 Ohm/sq.

Embodiment 7

The electrode, biosensor test strip, composite and method of any of embodiments 1, 2, 3, 4 and 5, wherein the inorganic material comprises a crystalline material or a polycrystalline material.

Embodiment 8

The electrode, biosensor test strip, composite and method of any of embodiments 1, 2, 3, 4 and 5, wherein the inorganic material comprises an oxide, a metal oxide, a transparent oxide, a transparent metal oxide, a dielectric compound and any combination thereof.

Embodiment 9

The electrode, biosensor test strip, composite and method of any of embodiments 1, 2, 3, 4 and 5, wherein the inorganic material comprises zinc oxide, indium oxide, tin oxide, cadmium oxide and any combination thereof.

Embodiment 10

The electrode, biosensor test strip, composite and method of any of embodiments 1, 2, 3, 4 and 5, wherein the inorganic material comprises aluminum zinc oxide (AZO), indium tin oxide (ITO), antimony tin oxide (ATO), fluorine tin oxide (FTO) and any combination thereof.

Embodiment 11

The electrode, biosensor test strip, composite and method of any of embodiments 1, 2, 3, 4 and 5, wherein the inorganic material comprises aluminum zinc oxide (AZO).

Embodiment 12

The electrode, biosensor test strip, composite and method of any of embodiments 1, 2, 4 and 5, wherein the inorganic material of the first layer has a shorter lattice parameter $a_1$ and the metal of the second layer has a shorter lattice parameter $a_2$, where $a_1$ and $a_2$ satisfy the following formula: $\frac{5}{6} * (a_1/a_2) = x$, where x represents a value of at least about 0.98 and not greater than about 1.02.

Embodiment 13

The electrode, biosensor test strip, composite and method of any of embodiments 1, 2, 3, 4 and 5, wherein the first layer does not contain tin oxide.

Embodiment 14

The electrode, biosensor test strip, composite and method of any of embodiments 1, 2, 3, 4 and 5, wherein the first layer does not contain carbon.

Embodiment 15

The electrode, biosensor test strip, composite and method of any of embodiments 1, 2, 3, 4 and 5, wherein the first layer comprises the inorganic material in an amount of 100% by weight of the first layer, not greater than about 99%, not greater than about 95%, not greater than about 90%, not greater than about 85%, not greater than about 80% and not greater than about 75%.

Embodiment 16

The electrode, biosensor test strip, composite and method of any of embodiments 1, 2, 3, 4 and 5, wherein the first layer comprises the inorganic material in an amount of at least about 50% by weight of the first layer, at least about 55%, at least about 60%, at least about 65%, at least about 70%, at least about 75%, at least about 80%, at least about 85%, at least about 90% and at least about 95%.

Embodiment 17

The electrode, biosensor test strip, composite and method of any of embodiments 1, 2, 3, 4 and 5, wherein the first layer has a thickness of not greater than about 20 nm, not greater than about 17 nm, not greater than about 15 nm, not greater than about 13 nm, not greater than about 10 nm, not greater than about 7 nm and not greater than about 5 nm.

Embodiment 18

The electrode, biosensor test strip, composite and method of any of embodiments 1, 2, 3, 4 and 5, wherein the first layer has a thickness of at least about 1 nm, at least about 2 nm, at least about 3 nm, at least about 4 nm and at least about 5 nm.

Embodiment 19

The electrode, biosensor test strip, composite and method of any of embodiments 1, 2, 3, 4 and 5, wherein the metal of the second layer (or the layer comprising a metal) comprises a crystalline material and a polycrystalline material.

Embodiment 20

The electrode, biosensor test strip, composite and method of any of embodiments 2, 3 and 4, wherein the metal of the second layer has a hexagonal compact crystalline structure.

Embodiment 21

The electrode, biosensor test strip, composite and method of any of embodiments 1, 2, 3, 4 and 5, wherein the second layer (or the layer comprising a metal) has a visible light transmittance of not greater than about 70%, not greater 60%, not greater than about 50%, not greater than about 40%, not greater than about 30%, not greater than about 25%, not greater than about 20%, not greater than about 15%, not greater than about 10%, not greater than about 5%, not greater than about 4%, not greater than about 3%, not greater than about 2% and not greater than about 1%.

Embodiment 22

The electrode, biosensor test strip, composite and method of any of embodiments 1, 2, 3, 4 and 5, wherein the second layer (or the layer comprising a metal) has a visible light transmittance of at least about 10%, at least about 5%, at least about 4%, at least about 3%, at least about 2% and at least about 1%.

Embodiment 23

The electrode, biosensor test strip, composite and method of any of embodiments 1, 2, 3, 4 and 5, wherein the second layer is a film or a thin film.

Embodiment 24

The electrode, biosensor test strip, composite and method of any of embodiments 1, 2, 3, 4 and 5, wherein the metal of the second layer has a purity of from 60% to 100%, from 65% to 95%, from 70% to 90% and from 75% to 85%.

Embodiment 25

The electrode, biosensor test strip, composite and method of any of embodiments 1, 2, 3, 4 and 5, wherein the electrode has a sheet resistance of at least about 2.0 Ohm/sq.

Embodiment 26

The electrode, biosensor test strip, composite and method of any of embodiments 1, 2, 3, 4 and 5, wherein the second layer has a thickness of at least about 10 nm, at least about 15 nm, at least about 20 nm, at least about 25 nm, at least about 30 nm, at least about 35 nm, at least about 40 nm, at least about 45 nm and at least about 50 nm.

Embodiment 27

The electrode, biosensor test strip, composite and method of any of embodiments 1, 2, 3, 4 and 5, wherein the second layer has a thickness of not greater than about 150 nm, not greater than about 140 nm, not greater than about 130 nm, not greater than about 120 nm, not greater than about 110 nm and not greater than about 100 nm.

Embodiment 28

The electrode, biosensor test strip, composite and method of any of embodiments 1, 2, 3, 4 and 5, wherein the second layer has a thickness of from 10 nm to 150 nm, from 20 nm to 70 nm, from 30 nm to 60 nm, from 40 nm to 50 nm and from 35 nm to 45 nm.

Embodiment 29

The electrode, biosensor test strip, composite and method of any of embodiments 1, 2, 3, 4 and 5, wherein the second layer has a resistivity of not greater than about $25 \times 10^{-6}$ Ohm·cm, not greater than about $24 \times 10^{-6}$ Ohm·cm, not greater than about $23 \times 10^{-6}$ Ohm·cm and not greater than about $22 \times 10^{-6}$ Ohm·cm and not greater than about $21 \times 10^{-6}$ Ohm·cm.

Embodiment 30

The electrode, biosensor test strip, composite and method of any of embodiments 1, 2, 3, 4 and 5, wherein the second layer has a resistivity of at least about $15 \times 10^{-6}$ Ohm·cm, at least about $16 \times 10^{-6}$ Ohm·cm, at least about $17 \times 10^{-6}$ Ohm·cm and at least about $18 \times 10^{-6}$ Ohm·cm.

Embodiment 31

The electrode, biosensor test strip, composite and method of any of embodiments 1, 2, 3, 4 and 5, wherein the substrate comprises a polymer, a flexible polymer and a transparent polymer.

Embodiment 32

The electrode, biosensor test strip, composite and method of any of embodiments 1, 2, 3, 4 and 5, wherein the substrate comprises polycarbonate, polyacrylate, polyester, polyethylene terephthalate (PET), polyethylene naphthalate (PEN), cellulose triacetated (TCA or TAC), polyurethane and any combination thereof.

Embodiment 33

The electrode, biosensor test strip, composite and method of any of embodiments 1, 2, 3, 4 and 5, wherein the substrate comprises polyethylene terephthalate (PET).

Embodiment 34

The electrode, biosensor test strip, composite and method of any of embodiments 1, 2, 3, 4 and 5, wherein the substrate has a thickness of at least about 50 microns, at least about 45 microns, at least about 40 microns, at least about 35 microns, at least about 30 microns, at least about 25 microns, at least about 20 microns, at least about 15 microns, at least about 10 microns, at least about 5 microns and at least about 1 micron.

Embodiment 35

The electrode, biosensor test strip, composite and method of any of embodiments 1, 2, 3, 4 and 5, wherein the substrate has a thickness of not greater than about 500 microns, not greater than about 200 microns, not greater than about 100 microns, not greater than about 90 microns, not greater than about 80 microns, not greater than about 75 microns, not greater than about 70 microns, not greater than about 65 microns, not greater than about 60 microns, not greater than about 55 microns and not greater than about 50 microns.

Embodiment 36

The electrode, biosensor test strip, composite and method of any of embodiments 1, 2, 3, 4 and 5, wherein the first layer directly contacts the substrate, the first layer directly contacts the second layer and the first layer directly contacts the substrate and the second layer.

Embodiment 37

The electrode, biosensor test strip, composite and method of any of embodiments 1, 2, 3, 4 and 5, wherein the electrode further comprises a third layer overlying the first layer and the second layer.

Embodiment 38

The electrode, biosensor test strip, composite and method of embodiment 37, wherein the third layer comprises Au.

Embodiment 39

The electrode, biosensor test strip, composite and method of embodiment 37, wherein the third layer comprises Pd.

Embodiment 40

The electrode, biosensor test strip, composite and method of any of embodiments 1, 2, 3, 4 and 5, wherein the first and second layers comprise epitaxial layers, wherein the first layer comprises a growth underlayer and the second layer comprises a metallic overlayer, wherein the metallic over layer comprises Au or Pd.

Embodiment 41

The electrode, biosensor test strip, composite and method of any of embodiments 1, 2, 3, 4 and 5, wherein the electrode further comprises a layer comprising a chemical solution.

Embodiment 42

The electrode, biosensor test strip, composite and method of any of embodiments 1, 2, 3, 4 and 5, wherein the electrode further comprises an enzyme, a mediator and any combination thereof.

Embodiment 43

The electrode, biosensor test strip, composite and method of any of embodiments 1, 2, 3, 4 and 5, wherein the (first) electrode is reactive to glucose.

Embodiment 44

The electrode, biosensor test strip, composite and method of any of embodiments 1, 2, 3, 4 and 5, wherein the electrode is a working electrode.

Embodiment 45

The biosensor test strip of embodiment 4, wherein the electrode system further comprises a counter electrode.

Embodiment 46

The method of embodiment 5, wherein the first layer is deposited directly onto the substrate, the layer comprising the metal is deposited directly onto a dielectric layer or both.

Embodiment 47

The method of embodiment 5, wherein the first layer is deposited by sputtering, the second layer is deposited by sputtering or both.

Embodiment 48

The method of embodiment 5, wherein the first layer and the second layer are deposited simultaneously using a roll-to-roll coater.

Embodiment 49

The method of embodiment 5, wherein the inorganic material of the first layer has a standard deposition rate.

Embodiment 50

The method of embodiment 5, wherein the first layer is deposited without annealing.

Embodiment 51

The method of embodiment 5, wherein the second layer is deposited at a low pressure.

Embodiment 52

The method of embodiment 5, wherein the second layer is deposited at a pressure of not greater than about 3 mTorr.

EXAMPLES

Example 1

Six sample electrodes S1-S6 were formed by depositing a layer of aluminum-doped zinc oxide (AZO) from a ceramic target and a layer of ruthenium (Ru) on a glass substrate. Sample electrodes S1-S6 have a stack configuration of Glass/AZO/Ru. The AZO and Ru layers were formed on the glass substrate with a batch magnetron sputtering deposition machine, with a low power density applied on the target. The thicknesses of the AZO and Ru layers for the respective examples are listed in Table 1.

Comparative sample electrodes CS1-CS7 were formed for performance comparison to the sample electrodes S1-S6. Comparative sample electrode CS1 has a stack configuration of Glass/Ru. The thickness of the Ru layer for the respective comparative sample CS1 is listed in Table 1. Comparative sample electrodes CS2-CS7 have a stack configuration of Glass/Ru/AZO. The thicknesses of the AZO and Ru layers for the respective examples are listed in Table 1.

Each sample electrode S1-S6 and comparative sample electrodes CS1-CS7 were measured to determine the sheet resistance of the electrode. The measurements were taken according to an electromagnetic non-contact method using a Nagy apparatus. The results are reported in Table 1 below.

TABLE 1

| Samples | AZO (nm) | Ru (nm) | Ru Deposition Pressure (mTorr) | R/sq (Ohm/sq) | Resistivity (μOhm · cm) | Sheet Resistance Improvement (AZO underlayer/ AZO overlayer) |
|---|---|---|---|---|---|---|
| CS1 | — | 75 | 1.5 | 2.68 | 20.1 | — |
| CS2 | 5 | 5 | 1.5 | 83.0 | 41.5 | 19.8% |
| S1 | 5 | 5 | 1.5 | 66.6 | 33.3 | |
| CS3 | 5 | 10 | 1.5 | 27.3 | 27.3 | 20.5% |
| S2 | 5 | 10 | 1.5 | 21.7 | 21.7 | |
| CS4 | 5 | 56 | 1.5 | 3.7 | 20.9 | 14.4% |
| S3 | 5 | 56 | 1.5 | 3.2 | 17.9 | |
| CS5 | 5 | 5 | 6 | 302.0 | 151 | 32.6% |
| S4 | 5 | 5 | 6 | 203.6 | 101.8 | |
| CS6 | 5 | 10 | 6 | 116.0 | 116 | 46.4% |
| S5 | 5 | 10 | 6 | 62.2 | 62.2 | |
| CS7 | 5 | 56 | 6 | 17.8 | 99.5 | 26.7% |
| S6 | 5 | 56 | 6 | 13.0 | 72.9 | |

The results in Table 1 confirm that for a wide range of Ruthenium thicknesses and for two different deposition pressures, an AZO underlayer contributes to a significant reduction of resistivity.

Example 2

Three sample electrodes S7-S9 were formed by depositing a layer of aluminum-doped zinc oxide (AZO) from a ceramic target and a layer of ruthenium (Ru) on a PET substrate. Sample electrodes S1-S6 have a stack configuration of PET/AZO/Ru. The AZO and Ru layers were formed on the PET substrate with a batch magnetron sputtering deposition machine, with a low power density applied on the target. The thicknesses of the AZO and Ru layers for the respective examples are listed in Table 2. Further, the deposition pressure for application of each Ru layer is also listed in Table 2.

Three comparative sample electrodes CS8-CS10 were formed for performance comparison to the sample electrodes S7-S9. Comparative sample electrodes CS8-CS10 have a stack configuration of PET/Ru. The thicknesses of the Ru layer for the respective sample CS8-CS10 are listed in Table 2. Further, the deposition pressure for application of each Ru layer is also listed in Table 2.

TABLE 2

| Samples | AZO (nm) | Ru (nm) | Ru Deposition Pressure (mTorr) | R/sq (Ohm/sq) | Resistivity ($\mu$Ohm · cm) | Sheet Resistance Improvement (AZO underlayer/ AZO overlayer) |
| --- | --- | --- | --- | --- | --- | --- |
| CS8 | — | 70 | 1.5 | 2.9 | 20.3 | 20.7% |
| S7 | 5 | 70 | 1.5 | 2.3 | 16.1 | |
| CS9 | — | 70 | 2 | 2.7 | 18.9 | 22.2% |
| S8 | 5 | 70 | 2 | 2.1 | 14.7 | |
| CS10 | — | 70 | 6 | 24 | 168 | 61.3% |
| S9 | 5 | 70 | 6 | 9.3 | 65.1 | |

Table 2 confirms that when deposited on a PET substrate, for a wide range of Ruthenium thicknesses and for three different deposition pressures, an AZO underlayer contributes to a significant reduction of resistivity.

Example 3

Two sample electrodes S10 and S11 were formed by depositing a layer of aluminum-doped zinc oxide (AZO) from a ceramic target and a layer of ruthenium (Ru) on a glass substrate. Sample electrodes S10 and S11 have a stack configuration of Glass/AZO/Ru. The AZO and Ru layers were formed on the PET substrate with a batch magnetron sputtering deposition machine, with a low power density applied on the target. The thicknesses of the AZO and Ru layers for the respective examples are listed in Table 3.

Two comparative sample electrodes CS11 and CS12 were formed for performance comparison to the sample electrodes S10 and S11. Comparative sample electrodes CS11 and CS12 have a stack configuration of Glass/Ru. The thicknesses of the Ru layer for the respective comparative sample CS11 and CS12 are listed in Table 3.

TABLE 3

| Samples | AZO (nm) | Ru (nm) | Ru Deposition Pressure (mTorr) |
| --- | --- | --- | --- |
| S10 | 5 | 56 | 1.5 |
| S11 | 5 | 56 | 1.5 |
| CS11 | — | 90 | 6 |
| CS12 | — | 90 | 6 |

Figure 2A:
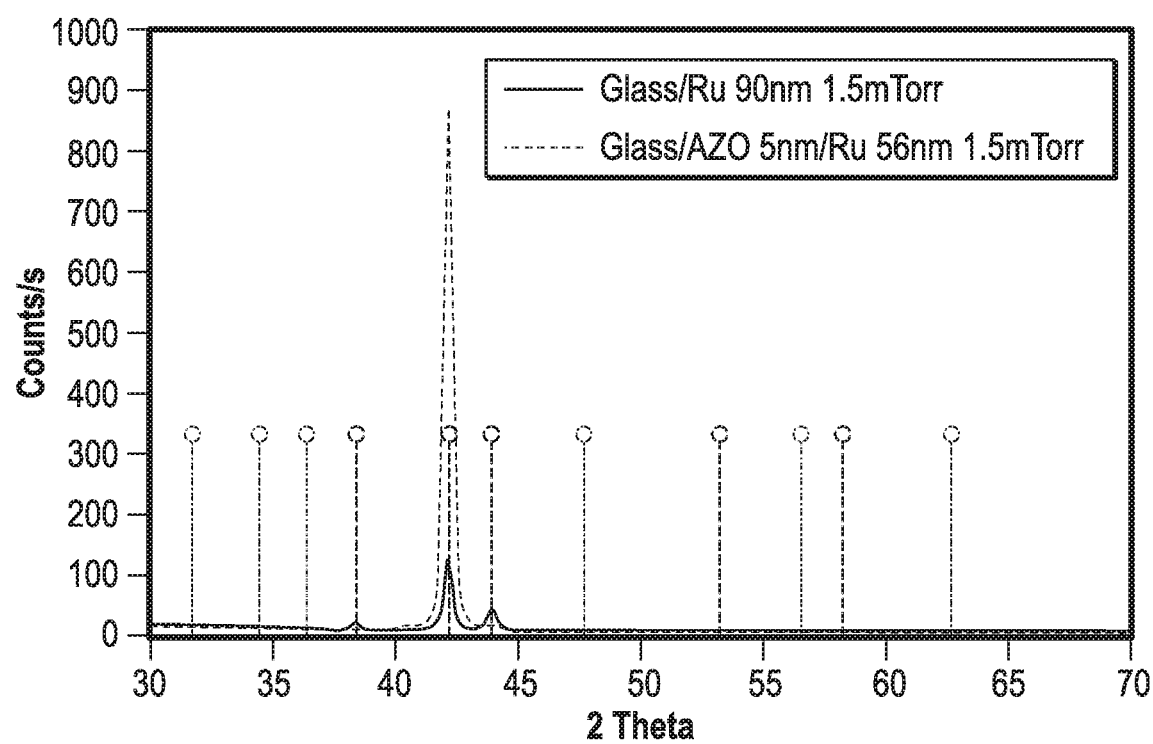
FIG. 2a includes a chart comparing the X-ray diffraction plots for an electrode according to embodiments described herein and a comparative electrode.

FIG. 2a is chart comparing the X-ray diffraction plots for sample electrode S10 and comparative sample electrode CS11. FIG. 2a shows that addition of AZO underlayer strongly enhances intensity of peak at 420, meaning a more crystalline ruthenium layer. The peak at 440 almost disappears on the diffraction plot for sample electrode S10, which includes an AZO underlayer. FIG. 2a also shows that crystallites have been orientated in the same direction by the addition of an AZO. In the diffraction plot for comparative sample electrode CS11, without any underlayer, two different orientations exist. This means that there is a higher relative disorder within the sample electrode CS11, causing the higher resistivity.

Figure 2B:
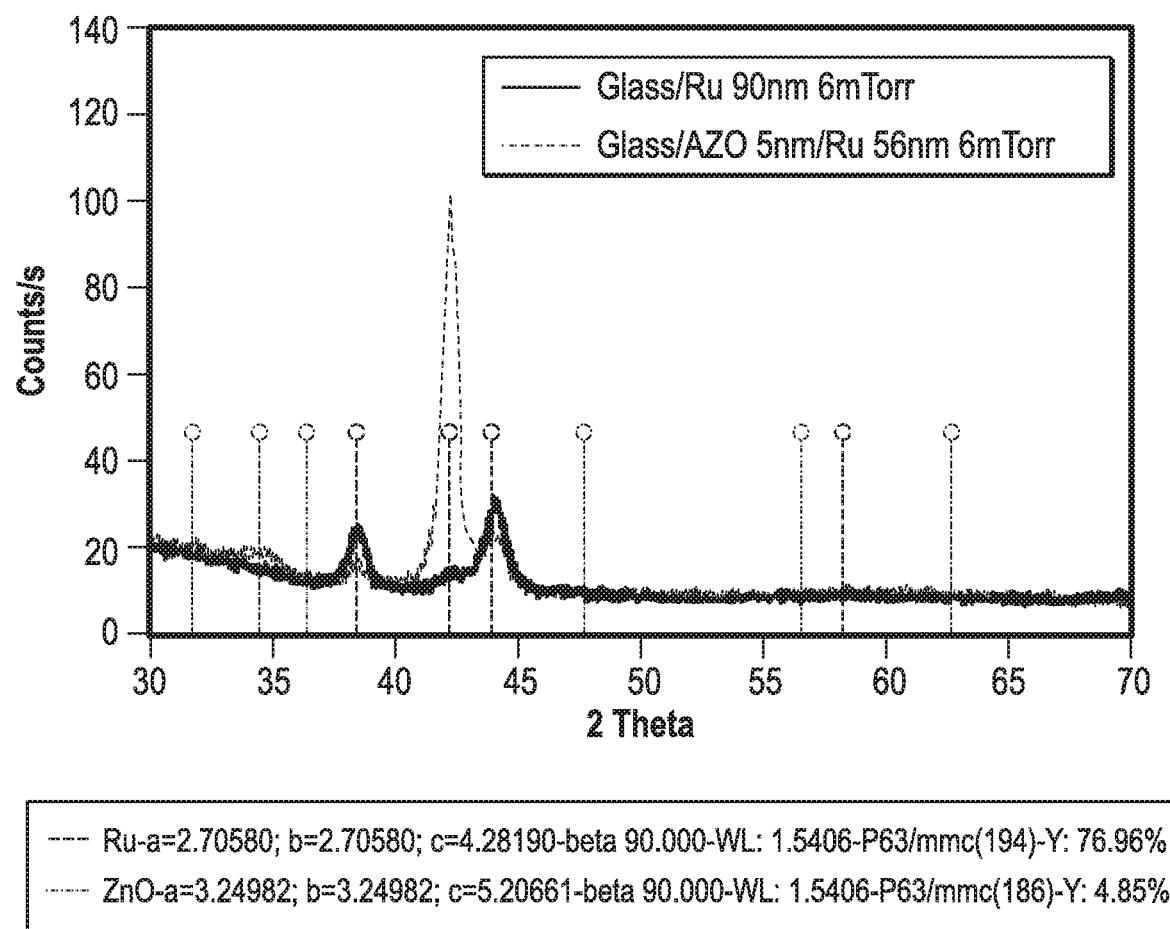
FIG. 2b includes a chart comparing the X-ray diffraction plots for an electrode according to embodiments described herein and a comparative electrode.

FIG. 2b is chart comparing the X-ray diffraction plots for sample electrode S11 and comparative sample electrode CS12. FIG. 2b shows the main preferential orientation of crystallites is switched when an AZO underlayer is added. The diffraction plot for sample electrode S11 shows a peak at 440 that is reduced and the one at 420 is strongly enhanced relative to the diffraction plot for comparative sample electrode CS12. Further, the diffraction spectrum of sample electrode S11, with an AZO underlayer, is close to the one of a Ru layer deposited at 1.5 mTorr. This is consistent with the reduction of resistivity that occurs when AZO underlayer is used in an electrode.

Note that not all of the activities described above in the general description or the examples are required, that a portion of a specific activity can not be required, and that one or more further activities can be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments can also be provided in combination in a single embodiment, and conversely, various features that are, for brevity, described in the context of a single embodiment, can also be provided separately or in any subcombination. Further, reference to values stated in ranges includes each and every value within that range. Many other embodiments can be apparent to skilled artisans only after reading this specification. Other embodiments can be used and derived from the disclosure, such that a structural substitution, logical substitution, or another change can be made without departing from the scope of the disclosure. Accordingly, the disclosure is to be regarded as illustrative rather than restrictive.

What is claimed is:

1. An electrode comprising:
   a substrate;
   a first layer comprising an inorganic material; and
   a second layer comprising ruthenium,
   wherein the second layer has a hexagonal compact crystalline structure,
   wherein the first layer is disposed between the substrate and the second layer, and
   wherein the inorganic material of the first layer has a shorter lattice parameter $a_1$ and the ruthenium of the second layer has a shorter lattice parameter $a_2$, where $a_1$ and $a_2$ satisfy the following formula: $5/6*(a_1/a_2)=x$, where x represents a value of at least about 0.98 and not greater than about 1.02.

2. The electrode of claim 1, wherein the second layer has a sheet resistance of at least about 2.0 Ohm/sq.

3. The electrode of claim 1, wherein the inorganic material comprises a crystalline material or a polycrystalline material.

4. The electrode of claim 1, wherein the inorganic material comprises an oxide, a metal oxide, a transparent oxide, a transparent metal oxide, a dielectric compound and any combination thereof.

5. The electrode of claim 1, wherein the inorganic material comprises zinc oxide, indium oxide, tin oxide, cadmium oxide and any combination thereof.

6. The electrode of claim 1, wherein the inorganic material comprises aluminum zinc oxide (AZO), indium tin oxide (ITO), antimony tin oxide (ATO), fluorine tin oxide (FTO) and any combination thereof.

7. The electrode of claim 1, wherein the inorganic material comprises aluminum zinc oxide (AZO).

8. The electrode of claim 1, wherein the first layer does not contain tin oxide.

9. The electrode of claim 1, wherein the first layer does not contain carbon.

10. The electrode of claim 1, wherein the first layer has a thickness of not greater than about 20 nm and at least about 1 nm.

11. The electrode of claim 1, wherein the second layer comprises a crystalline material and a polycrystalline material.

12. The electrode of claim 1, wherein the second layer has a thickness of at least about 10 nm and not greater than about 150 nm.

13. An electrode comprising:
    a substrate; and
    a first layer comprising an inorganic material having a shorter lattice parameter $a_1$; and
    a second layer comprising a ruthenium having a shorter lattice parameter $a_2$,
    wherein $a_1$ and $a_2$ satisfy the following formula: $5/6*(a_1/a_2)=x$, where x represents a value of at least about 0.98 and not greater than about 1.02.

14. The electrode of claim 13, wherein the second layer has a sheet resistance of at least about 2.0 Ohm/sq.

15. The electrode of claim 13, wherein the inorganic material comprises a crystalline material or a polycrystalline material.

16. The electrode of claim 13, wherein the inorganic material comprises an oxide, a metal oxide, a transparent oxide, a transparent metal oxide, a dielectric compound and any combination thereof.

17. The electrode of claim 13, wherein the inorganic material comprises zinc oxide, indium oxide, tin oxide, cadmium oxide and any combination thereof.

18. The electrode of claim 13, wherein the inorganic material comprises aluminum zinc oxide (AZO), indium tin oxide (ITO), antimony tin oxide (ATO), fluorine tin oxide (FTO) and any combination thereof.

* * * * *

UNITED STATES PATENT AND TRADEMARK OFFICE
CERTIFICATE OF CORRECTION

| | | |
|---|---|---|
| PATENT NO. | : 10,794,851 B2 | Page 1 of 1 |
| APPLICATION NO. | : 15/817969 | |
| DATED | : October 6, 2020 | |
| INVENTOR(S) | : Diguet et al. | |

It is certified that error appears in the above-identified patent and that said Letters Patent is hereby corrected as shown below:

On the Title Page

Column 2, item (56), Other Publications, page 2, Line 2, please delete "coatings or electrical", and insert --coatings for electrical--

In the Specification

Column 20, Line 14, please delete "420", and insert --42°--

Column 20, Line 15, please delete "440", and insert --44°--

Column 20, Line 46, please delete "440", and insert --44°--

Column 20, Line 46, please delete "420", and insert --42°--

Signed and Sealed this
Ninth Day of August, 2022

Katherine Kelly Vidal
*Director of the United States Patent and Trademark Office*